United States Patent [19]

Degen et al.

[11] Patent Number: 4,671,799
[45] Date of Patent: Jun. 9, 1987

[54] DYE MIXTURES FOR PAPER STOCK

[75] Inventors: Hans-Juergen Degen, Lorsch; Hans Kraus, Dannstadt-Schauernheim, both of Fed. Rep. of Germany

[73] Assignee: BASF Aktiengesellschaft, Ludwigshafen, Fed. Rep. of Germany

[21] Appl. No.: 878,794

[22] Filed: Jun. 26, 1986

[51] Int. Cl.$^4$ .................. C09B 62/00; C09B 29/00
[52] U.S. Cl. ............................. 8/638; 8/549; 8/639; 8/641; 8/682; 8/685; 8/919
[58] Field of Search .................. 8/638, 641, 661, 549

[56] References Cited

U.S. PATENT DOCUMENTS 2,300,572 11/1942 Hoyer et al. .................. 540/133
3,954,796 5/1976 Kuster ........................... 8/661
4,000,158 12/1976 von Tobel ...................... 8/602

FOREIGN PATENT DOCUMENTS 904992 9/1962 United Kingdom .

*Primary Examiner*—A. Lionel Clingman
*Attorney, Agent, or Firm*—Oblon, Fisher, Spivak, McClelland & Maier

[57] ABSTRACT

Novel dye mixtures which contain dyes of the general formulae I

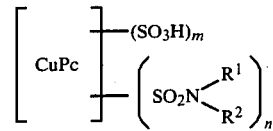

and II

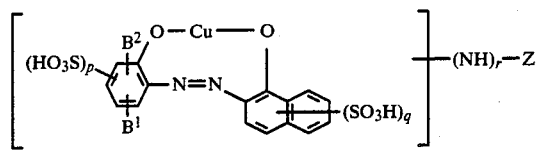

in the form of the alkali metal and ammonium salts, where m and n are each 0 to 4, p and q are each 1 or 2, r is 0 or 1, m+n is 2, 3 or 4, $B^1$ and $B^2$ are each hydrogen or chlorine, or $B^1$ and $B^2$ together form part of a fused benzene ring which is unsubstituted or substituted by SO$_3$H, $R^1$ and $R^2$ independently of one another are each hydrogen or unsubstituted or substituted lower alkyl or cyclohexyl, or $R^1$ and $R^2$ together with the nitrogen form a saturated heterocyclic structure, and Z is a reactive radical which is usually present in reactive dyes and which is bonded to the diazo or coupling component, are very useful for dyeing paper stocks.

2 Claims, No Drawings

DYE MIXTURES FOR PAPER STOCK

The present invention relates to dye mixtures which contain dyes of the general formulae I

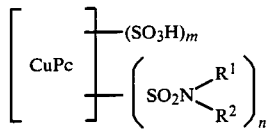

and II

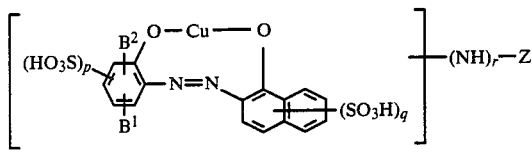

in the form of the alkali metal and ammonium salts, where m and n are each 0 to 4, p and q are each 1 or 2, r is 0 or 1, m+n is 2, 3 or 4, $B^1$ and $B^2$ are each hydrogen or chlorine, or $B^1$ and $B^2$ together form part of a fused benzene ring which is unsubstituted or substituted by $SO_3H$, $R^1$ and $R^2$ independently of one another are each hydrogen or unsubstituted or substituted lower alkyl or cyclohexyl, or $R^1$ and $R_2$ together with the nitrogen form a saturated heterocyclic structure, and Z is a reactive radical which is usually present in reactive dyes and which is bonded to the diazo or coupling component.

The reactive radicals are derived from, for example, the pyridimine, pyridazonyl, quinazolinyl, β-sulfatoethyl-sulfonyl or, preferably, triazinyl series.

The reactive radicals may furthermore have been modified so that the reactive substituents, such as fluorine or chlorine, have been exchanged for, for example, unsubstituted or substituted hydroxyl or amino. The radical Z is usually bonded via the NH group, but a direct bond may be present, for example in the case of the β-sulfatoethylsulfonyl radicals, i.e. where r is 0.

The present invention relates in particular to dye mixtures which contain dyes of the formulae Ia

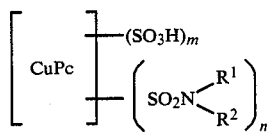

and IIa

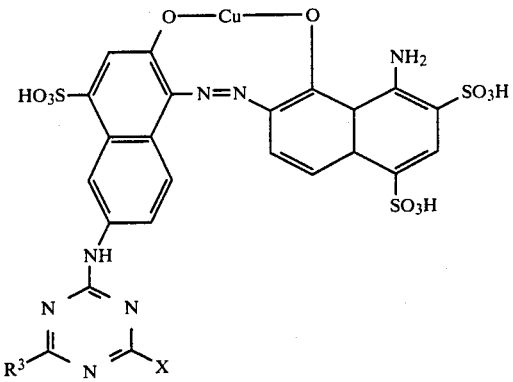

in the form of the alkali metal or ammonium salts, where m, n, $R^1$ and $R^2$ have the stated meanings, $R^3$ is unsubstituted or substituted amino and X is fluorine, chlorine, bromine, hydroxyl, alkoxy or unsubstituted or substituted amino.

In addition to being hydrogen, $R^1$ and $R^2$ are each, for example, $C_1$-$C_4$-alkyl which may be substituted by hydroxyl or by $C_1$-$C_4$-alkoxy. Specific examples of radicals are $CH_3$, $C_2H_5$, $C_3H_7$, $C_4H_9$, $C_2H_4OH$, $C_3H_6OH$, $CH_2CHOHCH_3$ and $CH_2CHOHCH_2OH$, and specific example of radicals formed from $R^1$ and $R^2$ together with the nitrogen are

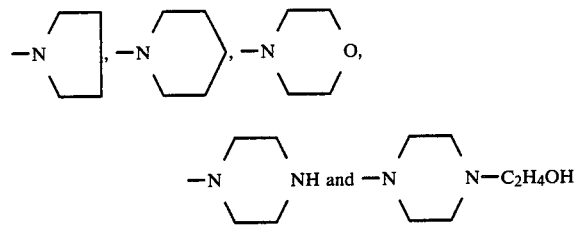

$R^3$ is, for example, $NH_2$, $NHCH_3$, $NHC_2H_5$, $NHC_2H_4OOH$,

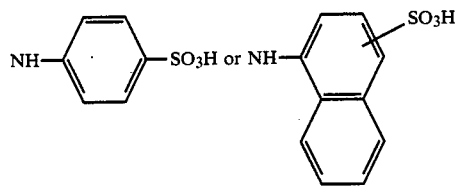

Substituted amine radicals X are those stated for $R^3$

The novel mixtures are advantageously prepared by mechanically mixing the salts of the dyes of the formulae I and II or, where liquid formulations are desired, by dissolution or by mixing liquid formulations.

Preferred cations are lithium, sodium, ammonium, mono-, di- and trihydroxyalkylammonium, alkoxyalkylammonium, hydroxyalkylalkoxyalkylammonium and hydroxyalkylalkylammonium.

Surprisingly, we have found that, on paper stocks, the novel mixtures give dyeings in which the feared two-sidedness, ie. different depths and, where relevant, hues of the topside and wire side, is scarcely noticeable if at all. Paper stocks which contain aluminum ions, those which are free of these ions and filler-containing paper stocks are equally suitable for dyeing. This is all the more surprising since the compounds of the formulae I and II have very different hues and, when used as individual dyes, tend to give one-sided dyeings. Moreover, we have found that it is also possible for papers having very different filler contents to be dyed with the novel mixtures without the occurrence of two-sidedness; if the latter occurs at all, it is sufficient as a rule to vary the ratios of the dyes of the formulae I and II in the mixture.

Surprisingly, the novel mixtures furthermore give dyeings having very good fastness to oxides of nitrogen.

The mixtures according to the invention advantageously contain the dyes of the formulae I and II in a ratio of from 5:95 to 50:50, particularly preferably from 60:40 to 90:10.

Particularly preferred dyes of the formula I are those in which $R^1$ and $R^2$ are identical and are each H, m is 1.5–2.5 and n is 0.5–1.5, and preferred dyes of the formula IIa are those in which $R^3$ is $NH_2$ and X is Cl.

Particularly preferred cations are $Li^\oplus$, $Na^\oplus$, $NH_4^\oplus$ and mono-, di- and trihydroxyalkylammonium.

The mixtures according to the invention give brilliant medium blue hues on paper, which were previously obtained essentially by combining more than two dyes when two-sidedness was to be kept at a low level. The conventional mixtures contain, as an essential component, blue dyes based on dimethoxybenzidine which, however, are not fast to oxides of nitrogen.

In the Examples which follow, parts and percentages are by weight, unless stated otherwise.

EXAMPLE 1

A paper having a basis weight of 80 g/m² was produced on a Fourdrinier paper machine at a production rate of 60 m/min. The raw materials used for the paper were 50 parts of bleached pine sulfate pulp, 50 parts of bleached beach sulfite pulp and 15 parts of filter. The filler used was talc, kaolin (china clay) or chalk. The papers were sized with 0.5 part of resin and 2.5 parts of allum. The amount of filler in the finished paper was from 50 to 60%, based on the amount of filler used.

The papers were dyed using the dyes stated below. The dye was added to the vat, with thorough stirring. The residence time until discharge onto the machine wire was not less than 15 minutes. The headbox density of the paper stock was 0.8%.

To determine the relative two-sidedness, the depth of shade of the wire side (referred to here as the underside (US)) was set at 100 in each case, and the two-sidedness was stated as the relative depth of shade of the felt side (referred to here as the top side of the paper (TS)). Thus, values of less than 100 denote a negative two-sidedness, while values greater than 100 represent a positive two-sidedness. 100 indicates paper having absolutely identical shades on both sides.

Visual color matching of the resulting sheets by experienced colorists shows that it is possible to distinguish differences in depths of shade between the top side and the wire side only when these differences are >5%. Papers with differences in depth of shade of less than 10% can be regarded as slightly two-sided, compared with the commercially available papers.

Chromaticity coordinates x and y of the top and wire sides of the paper sheets were also determined.

The tristimulus value Y was employed as the luminosity.

The color was measured by measuring the reflectance of the paper sheets according to DIN 5033, using a Zeiss RFC 16 spectrophotometer, light type D 65/10°.

The measured values too show that there are only very slight differences between the colorations of the top side and the wire side.

TABLE 1

Filler: talc
Behavior of the individual dyes under experimental conditions

| Dyes used | Relative depth of the topside (TS) [underside (US) = 100] | Chromaticity coordinate X. TS/US | Y. TS/US | Tristimulus value Y. |
|---|---|---|---|---|
| D.B. 199 (Formula I, n = 2, M = 1, $R^1 = R^2 = H$) | 130 | 0.2308 / 0.2312 | 0.3316 / 0.3298 | 44.96 / 44.52 |
| Formula II $R^3 = NH_2$, X = chlorine | 92 | 0.2571 / 0.2567 | 0.2875 / 0.2873 | 37.70 / 37.76 |

TABLE 2

Filler: talc
Mixtures of Direct Blue 199 and the dye of the formula II, where $R^3$ is $NH_2$ and X is chlorine.

| No. of parts of D.B. 199 / No. of parts of dye of the formula II, $R^3 = NH_2$, X = chlorine | Relative depth of shade of the topside (TS) [underside (US) = 100] | Chromaticity coordinat X. TS/US | Y. TS/US | Tristimulus value Y. |
|---|---|---|---|---|
| 25/1 | 114 | 0.1664 / 0.1661 | 0.3225 / 0.3210 | 44.34 / 43.40 |
| 25/2.2 | 110 | 0.1707 / 0.1670 | 0.3205 / 0.3193 | 43.84 / 42.96 |
| 25/3.8 | 107 | 0.1728 / 0.17.5 | 0.3180 / 0.3175 | 42.03 / 41.61 |
| 25/6.2 | 103 | 0.1729 / 0.1718 | 0.3149 / 0.3148 | 39.81 / 39.52 |
| 25/9 | 100 | 0.1759 / 0.1757 | 0.3136 / 0.3140 | 38.92 / 38.93 |
| 25/12 | 98 | 0.1779 / 0.1783 | 0.3119 / 0.3131 | 38.67 / 38.72 |

We claim:
1. A dye mixture which contains dyes of the formulae I

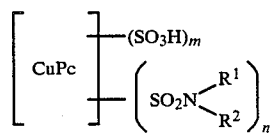

and II

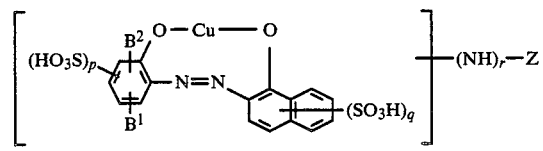

in the form of the alkali metal and ammonium salts, where m and n are each 0 to 4, p and q are each 1 or 2, r is 0 or 1, m+n is 2, 3 or 4, $B^1$ and $B^2$ are each hydrogen or chlorine, or $B^1$ and $B^2$ together form part of a fused benzene ring which is unsubstituted or substituted by $SO_3H$, $R^1$ and $R^2$ independently of one another are each hydrogen or unsubstituted or substituted lower alkyl or cyclohexyl, or $R^1$ and $R^2$ together with the nitrogen form a saturated heterocyclic structure, and Z is a reactive radical which is usually present in reactive dyes and which is bonded to the diazo or coupling component.

2. A dye mixture which contains dyes of the formulae Ia

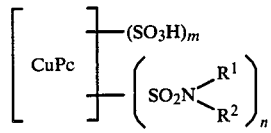

and IIa

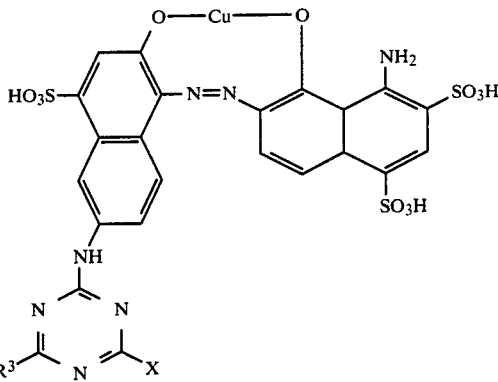

in the form of the alkali metal or ammonium salts, where m, n, $R^1$ and $R^2$ have the stated meanings, $R^3$ is unsubstituted or substituted amino and X is fluorine, chlorine, bromine, hydroxyl, alkoxy or unsubstituted or substituted amino.

* * * * *

UNITED STATES PATENT AND TRADEMARK OFFICE
CERTIFICATE OF CORRECTION

PATENT NO. : 4,671,799

DATED : June 9, 1987

INVENTOR(S) : Degen, et al.

It is certified that error appears in the above-identified patent and that said Letters Patent is hereby corrected as shown below:

--Priority data was omitted from the Letters Patent.
It should read:

July 3, 1985 [DE] Fed. Rep. of Germany..........
............3523691--

Signed and Sealed this

First Day of September, 1987

*Attest:*

DONALD J. QUIGG

*Attesting Officer*    *Commissioner of Patents and Trademarks*